P. PEFFER.
SHAFT COUPLING.
No. 81,940.
Patented Sept. 8, 1868.
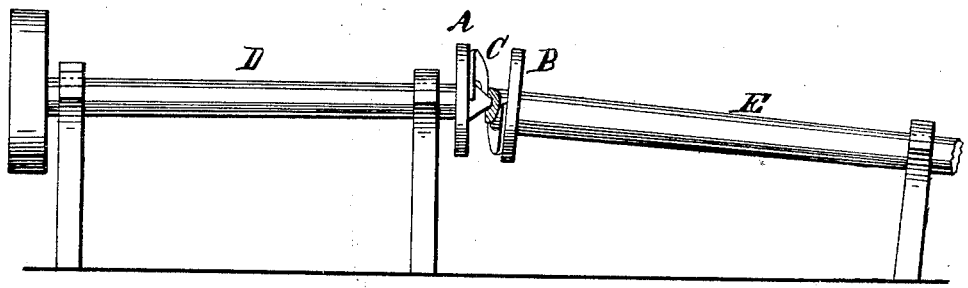
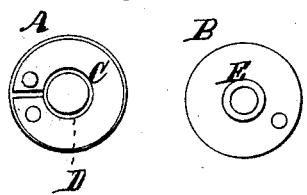
Witnesses.
Wm A Morgan
G C Cotton
Inventor.
Philip Peffer
per Munn & Co
Attorneys

United States Patent Office.

PHILIP PEFFER, OF MILROY, PENNSYLVANIA.

Letters Patent No. 81,940, dated September 8, 1868.

IMPROVEMENT IN SHAFT-COUPLING.

The Schedule referred to in these Letters Patent and making part of the same.

TO ALL WHOM IT MAY CONCERN:

Be it known that I, PHILIP PEFFER, of Milroy, in the county of Mifflin, and State of Pennsylvania, have invented a new and useful Improvement in Shaft-Coupling; and I do hereby declare that the following is a full, clear, and exact description thereof, which will enable others skilled in the art to make and use the same, reference being had to the accompanying drawings, forming part of this specification, in which—

Figure 1 represents a side elevation of a couple of shafts joined together by my improved coupling, and Figure 2 represents face views of the collars of the shafts, one of which shows the spring connected to it.

Similar letters of reference indicate like parts.

The object of this invention is to provide a cheap coupling, that will admit the shafts to be arranged out of line, and at the same time to run without noise or jarring.

It consists in connecting the ends of the shafts together by a curved spring, united at one end to one shaft, and at the other to the other shaft, and supporting the end of one shaft, which is provided with a socket on the pointed end of the other shaft, the points in the ends of the shafts, or the flanges to which the ends of the spring are connected, being coincident.

D and E represent two sections of shafts, provided with collars, A and B, at the ends to be coupled together. The end of one shaft is provided with a socket, and the end of the other fitted into it.

C represents the spring by which the two shafts are connected, the arrangement of which is such as will admit the shafts to run in different planes, while it will transmit rotary motion, the breadth in radial lines of the spring being of a sufficient length to produce the necessary torsional strength, while it will readily yield laterally to the varying positions of the collars, or the faces of the ends of the shafts, and has a tendency to draw the two shafts together lengthwise, and maintain the ends in contact, so that one is supported on the other.

Having thus described my invention, I claim as new, and desire to secure by Letters Patent—

The combination, with the shafts D and E, when connected together by a point and socket, of the spring C, substantially as and for the purpose described.

The above specification of my invention signed by me, this second day of July, 1868.

PHILIP PEFFER.

Witnesses:
A. B. SELHEIMER,
N. J. RUDISILL.